July 11, 1944.  D. SCHACHAR  2,353,504
MEANS FOR MAKING FILM SHEETS
Filed Feb. 19, 1942
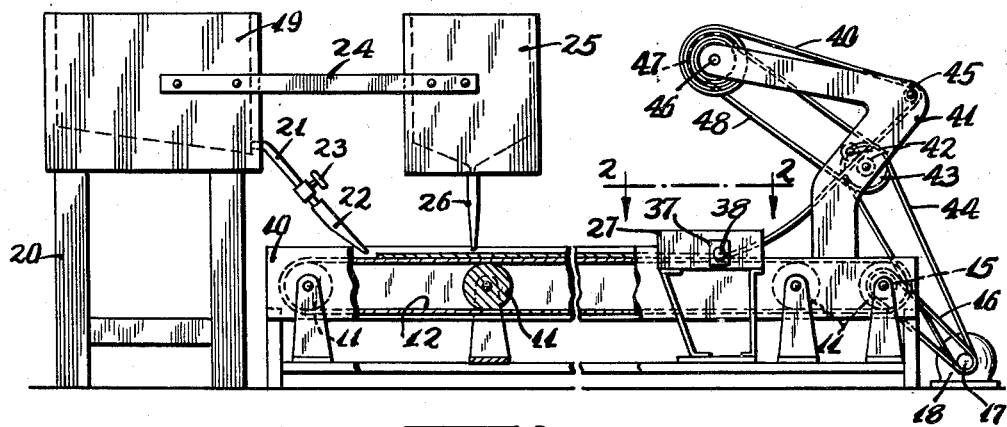
Fig. 1.
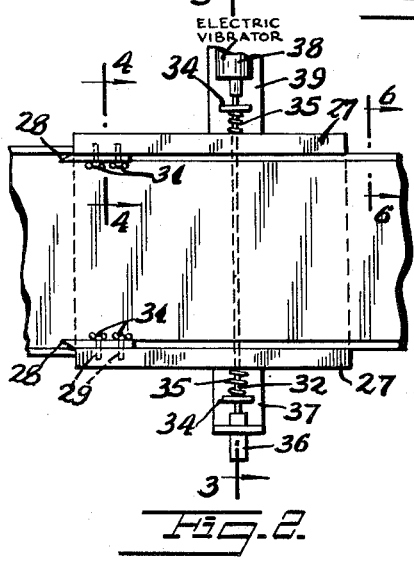
Fig. 2.
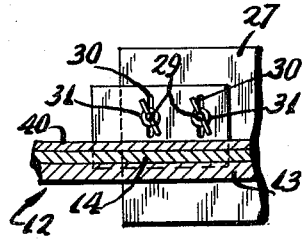
Fig. 3.
Fig. 4.
Fig. 5.
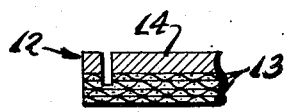
Fig. 6.
INVENTOR
David Schachar
BY
ATTORNEY Patented July 11, 1944

2,353,504

UNITED STATES PATENT OFFICE 2,353,504

MEANS FOR MAKING FILM SHEETS

David Schachar, Brooklyn, N. Y., assignor of one-half to Nathan Gromer, Brooklyn, N. Y.

Application February 19, 1942, Serial No. 431,499

1 Claim. (Cl. 18—15)

This invention relates to new and useful improvements in a method and means for making film sheets.

More specifically, the invention proposes a method for making a film sheet which consists in heating and dissolving gelatin in water and then pouring the gelatin on a flat surface, allowing it to cool to permit a liquid having film forming qualities to be poured upon the hardened gelatin in a manner to dry and form a film.

Still further it is proposed to provide a means for peeling the dried film from the gelatin and arranged to strip the thin sheet from the gelatin adjacent the top surface thereof.

A further object of the invention proposes to drop crystals upon the film forming liquid while in a semi-dry state to become embedded in the surface of the film and produce a film having a designed surface.

Another object of the invention proposes that the film forming liquid be a clear lacquer or any fast drying liquid.

It is a further object of the invention to construct an article arranged to permit the film forming liquid to be continuously poured upon a continuous gelatin belt and to strip the dried film forming liquid from the continuous belt in a continuous strip, forming an elongated transparent film.

A further object of the invention proposes a novel means for winding the continuous web of transparent film into a convenient roll to permit desired lengths of the film to be later unwound.

A further object of this invention proposes a novel means for stripping the dried film from the gelatin surface and which is characterized by a vibrated wire engageable between the adjacent faces of the gelatin and the dried film.

For further comprehension of this invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is a side elevational view of a machine used for making a transparent film sheet in accordance with this invention.

Fig. 2 is an enlarged detailed plan view looking in the direction of the line 2—2 of Fig. 1.

Fig. 3 is a vertical sectional view taken on the line 3—3 of Fig. 2.

Fig. 4 is an enlarged partial vertical sectional view taken on the line 4—4 of Fig. 2.

Fig. 5 is a vertical sectional view taken on the line 5—5 of Fig. 4.

Fig. 6 is a sectional view of a portion of the belt taken on the line 6—6 of Fig. 2.

The method and means for making a film sheet, according to this invention, consists in heating and dissolving gelatin in water and then pouring the gelatin on a flat surface, permitting it to cool. A layer of liquid having film forming properties is then poured upon the hardened gelatin and is allowed to dry to form a film. The dried film is then peeled from the gelatin and is now in the form of a thin sheet.

On the drawing a device is illustrated for carrying out this method of forming a thin sheet of transparent film. This machine is characterized by a frame 10 rotatively supporting a plurality of adjacent rollers 11 over which a belt 12 is engaged. The belt 12 is of a novel construction and includes a plurality of layers of belting material 13 which are securely attached together in face contact with each other and which engages the rollers 11. On the free face of the belting material 13 a layer of heated and dissolved gelatin 14 is poured and is allowed to cool to form a flat surface upon the belting material 13. The belt 12 is continuous in construction and a means is provided for advancing the belt over the rollers 11. This means comprises a pulley 15 mounted concentric with one of the rollers 11 and over which a belt 16 engages. This belt 16 engages a second pulley 17 mounted upon the projected shaft of an electric motor 18. The electric motor is connected with a source of energy, not shown on the drawing, for advancing the belt 16 to rotate the roller 11 which carries the pulley 15.

Means is provided for depositing a layer of liquid having film forming qualities upon the gelatin surface 14 of the belt 12. This means comprises a large container 19 supported at an elevated position adjacent the end of the frame 10 upon legs 20. A pipe 21 extends from the container 19 and has a nozzle 22 mounted upon the lower end thereof. The free end of the nozzle 22 is arranged at a position adjacent the gelatin surface 14 of the belt 12. A valve 23 is mounted on an intermediate portion of the pipe 21 and controls the flow of liquid from the container 19 to the belt 12. The film forming liquid may be either a clear lacquer or any fast drying liquid and is adapted to be fed from the nozzle 22 at a rate to form a comparatively thin film on the gelatin surface 14. If it is desired to provide a colored film it is merely necessary to add a dye of the desired color to the liquid having the film forming properties before it is fed through the nozzle 22.

Projecting from the container 19 there is a pair of adjacent brackets 24 upon which a container 25 is mounted. This container 25 is adapted to be filled with crystals to be fed through a nozzle 26 mounted on the bottom end of the container 25. These crystals are adapted to be fed to the liquid having the film forming qualities while still in a semi-soft state to produce a flexible transparent sheet having an unusual decorative effect.

The belt 12 after passing beneath the container 25 is adapted to pass through a U-shaped bracket 27 supported upon a portion of the frame 10. This U-shaped bracket 27 has its intermediate arm disposed immediately adjacent the bottom face of the belt 12 and its side arms extending upwards along the side edges of the belt 12. Means is provided for trimming the edges of the film forming material after it has dried upon the surface of the gelatin 14. The distance between the container 25 and the U-shaped bracket 27 should be of a sufficient length to permit the film forming liquid to thoroughly dry into a thin hardened condition.

The trimming means is characterized by a pair of knives 28 mounted upon the front edge of the vertical arms of the U-shaped bracket 27. These knives are adjustably supported upon the vertical arms and this adjustment is characterized by screws 29 which project from the side walls of the U-shaped bracket 27. The screws 29 pass through elongated slots 30 formed in the knives 28 and thumb nuts 31 are threadedly engaged on the projected ends of the screws 29 and are arranged to clamp the knives 28 in various adjusted elevations relative to the belt 12. The knives 28 are arranged for trimming the edges of the dry sheet of film forming liquid to provide parallel sides on the completed sheet.

Means is provided for peeling off the dried film from the outer surface of the gelatin 14 of the belt 12. This means is also mounted upon the U-shaped bracket 27 and is characterized by a length of relatively stiff wire 32 which has its ends projected between the side arms of the U-shaped bracket 27. The ends of the wire 32 are projected through openings 33 formed in the vertical arms of the U-shaped bracket 27. Collars 34 are fixedly mounted upon the outer ends of the wire 32 and are spaced from the adjacent faces of the U-shaped bracket 27. Springs 35 are coaxially mounted upon the wire 32 and operate between the collars 34 and the adjacent faces of the vertical arms of the U-shaped bracket. These springs 35 tend to urge the wire 32 into a position in which the collars 34 are centralized with relation to the U-shaped bracket 27. One end of the wire 32 is provided with a stud 36 which slidably extends through an opening in a bracket 37 mounted on one side of the U-shaped bracket 27. The opposite end of the wire 32 is connected with an electric vibrator 38 mounted on a bracket 39. The bracket 39 is mounted upon the opposite side of the U-shaped bracket 27. The wire 32 is adapted to be engaged between the adjacent faces of the dried film and the gelatin 14 for separating the film from the gelatin in a continuous web 40.

Means is provided for rolling the dried web into a convenient roll. This means comprises a pair of upwardly spaced brackets 41 projecting from the frame 10. A pair of feed rollers 42 are rotatively supported upon the brackets 41 and the web 40 is adapted to be passed therethrough.

One of the rollers 42 is provided with a pulley 43 over which a belt 44 engages. This belt engages a second pulley mounted upon the projected shaft of the motor 18 for drawing the dried web 40 upwards from the belt 12. The web 40, after passing between the feed rollers 42, passes over a second roller 45 and is then wound upon a shaft 46 mounted upon the free end of the brackets 41. The shaft 46 carries a removably mounted pulley 47 over which a belt 48 engages. The belt 48 also engages over a second pulley arranged concentric with the pulley 43 for winding the web 40 upon the shaft 46.

The operation of this device is as follows:

The belt 12 is prepared by forming a gelatin surface 14 on one side of the belting material 13. The belt 12 is then driven by energizing the motor 18, and the liquid having the film forming properties is placed within the container 19. The valve 23 is adjusted to feed the film forming liquid through the nozzle 22 at a desired rate of speed to form a film having the desired thickness. If it is desired to sprinkle crystals on the film forming liquid, the crystals are placed into the container 25 to be fed through the nozzle 26. The belt 12 then continues to advance permitting the film forming liquid to have sufficient time to dry before it enters the U-shaped bracket 27. Upon first entering the U-shaped bracket the knives 28 will act to trim the side edges of the dried sheet and the dried sheet is then partially manually separated from the gelatin surface 14 to pass over the top of the wire 32. The free end of the dried sheet is then passed through the said rollers 42 to be wound upon the shaft 46. The electric vibrator 38 will then act to vibrate the wire 32 to separate the dried sheet from the surface of the gelatin 14.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

A device of the class described having an endless belt upon which a film sheet is adapted to be formed, a U-shaped bracket through which said belt and film sheet is adapted to pass, a wire extended between the side arms of said U-shaped bracket at an elevation to engage between the adjacent faces of said belt and film sheet, said wire having its ends projected freely through openings formed in the side walls of said U-shaped bracket, resilient means for maintaining said wire taut and for urging said wire into a neutral position between the side walls of said U-shaped bracket, a vibrator connected with one end of said wire for vibrating said wire to more efficiently strip said film sheet from said belt, said resilient means comprising collars fixedly mounted on the projected end portions of said wire and spaced from the outside faces of the side walls of said U-shaped bracket and springs coaxially engaged upon the end portions of said wire and operating between the adjacent faces of the side walls of said U-shaped bracket and said collars, and a hopper containing the material for forming said film sheet supported at one end of said belt, said hopper being provided with control means to regulate the flow of material on said belt.

DAVID SCHACHAR.